United States Patent
Parkinson et al.

(10) Patent No.: US 9,507,772 B2
(45) Date of Patent: Nov. 29, 2016

(54) INSTANT TRANSLATION SYSTEM

(71) Applicant: Kopin Corporation, Taunton, MA (US)

(72) Inventors: Christopher Parkinson, Richland, WA (US); Jeffrey J. Jacobsen, Hollister, CA (US); David Bruce Ferguson, Boca Raton, FL (US); Stephen A. Pombo, Campbell, CA (US)

(73) Assignee: Kopin Corporation, Taunton, MA (US)

( * ) Notice: Subject to any disclaimer, the term of this patent is extended or adjusted under 35 U.S.C. 154(b) by 115 days.

(21) Appl. No.: 13/869,435

(22) Filed: Apr. 24, 2013

(65) Prior Publication Data

US 2013/0289971 A1     Oct. 31, 2013

Related U.S. Application Data

(60) Provisional application No. 61/638,419, filed on Apr. 25, 2012, provisional application No. 61/660,478, filed on Jun. 15, 2012.

(51) Int. Cl.
  *G06F 17/28* (2006.01)
  *G10L 15/26* (2006.01)

(52) U.S. Cl.
  CPC ............ *G06F 17/289* (2013.01); *G10L 15/26* (2013.01)

(58) Field of Classification Search
  CPC ............ G06F 17/289; G06F 17/2872; G06F 3/0236; G10L 15/30; G10L 15/32; G10L 13/00; H04B 1/38; H04B 1/385; H04B 2001/3866
  USPC ............ 704/2, 9, 8, 3, 275, 270.1, 258, 235, 704/231; 455/574, 413; 370/352; 235/472.03, 462.3
  See application file for complete search history.

(56) References Cited

U.S. PATENT DOCUMENTS

| | | | |
|---|---|---|---|
| 5,005,213 A | | 4/1991 | Hanson et al. |
| 5,208,449 A | * | 5/1993 | Eastman ............ G06K 7/10891 235/462.3 |

(Continued)

FOREIGN PATENT DOCUMENTS

| | | |
|---|---|---|
| CN | 1797299 A | 7/2006 |
| CN | 101196793 A | 6/2008 |

(Continued)

OTHER PUBLICATIONS

International Search Report and Written Opinion of the International Searching Authority from International Application No. PCT/US2013/037988, titled "Instant Translation System," mailed Jul. 3, 2013.

(Continued)

*Primary Examiner* — Michael Colucci
(74) *Attorney, Agent, or Firm* — Hamilton, Brook, Smith & Reynolds, P.C.

(57) ABSTRACT

A method of, and corresponding headset computer for, performing instant speech translation including, establishing a local network including a link between a first and a second headset computer in which preferred language settings of each headset computer are exchanged, transmitting captured speech in a first language from a first headset computer to a network-based speech recognition service to recognize and transcribe the captured speech as text, receiving the text at the first headset computer, broadcasting the text over the local network to at least the second headset computer, receiving the text at the second headset computer, transmitting the received text from the second headset computer to a network-based text translation service to translate the text to a text in a second language, receiving the text in the second language at the second headset computer from the network-based text translation service, and displaying the translated text at the second headset computer.

18 Claims, 9 Drawing Sheets

(56) References Cited

U.S. PATENT DOCUMENTS

| | | |
|---|---|---|
| 5,594,469 A | 1/1997 | Freeman et al. |
| 5,698,834 A * | 12/1997 | Worthington ...... G06K 7/10881 235/462.45 |
| 6,084,556 A | 7/2000 | Zwern |
| 6,198,462 B1 | 3/2001 | Daily et al. |
| 6,313,864 B1 | 11/2001 | Tabata et al. |
| 6,369,952 B1 | 4/2002 | Rallison et al. |
| 6,408,257 B1 | 6/2002 | Harrington |
| 6,532,446 B1 * | 3/2003 | King ........................ G10L 15/22 704/231 |
| 6,538,676 B1 | 3/2003 | Peters et al. |
| 6,778,906 B1 | 8/2004 | Hennings et al. |
| 6,965,862 B2 * | 11/2005 | Schuller .................. G10L 13/00 358/473 |
| 7,501,995 B2 | 3/2009 | Morita et al. |
| 8,184,983 B1 | 5/2012 | Ho et al. |
| 8,327,295 B2 | 12/2012 | Ikeda |
| 8,838,075 B2 * | 9/2014 | Basir ...................... H04M 1/271 455/413 |
| 8,855,719 B2 | 10/2014 | Jacobsen et al. |
| 8,862,186 B2 | 10/2014 | Jacobsen et al. |
| 8,929,954 B2 | 1/2015 | Jacobsen et al. |
| 9,122,307 B2 | 9/2015 | Jacobsen et al. |
| 9,235,262 B2 | 1/2016 | Jacobsen et al. |
| 9,294,607 B2 | 3/2016 | Jacobsen et al. |
| 9,316,827 B2 | 4/2016 | Lindley et al. |
| 9,369,760 B2 | 6/2016 | Jacobsen et al. |
| 2001/0003712 A1 | 6/2001 | Roclofs |
| 2002/0030649 A1 | 3/2002 | Zavracky et al. |
| 2002/0044152 A1 | 4/2002 | Abbott, III et al. |
| 2002/0154070 A1 | 10/2002 | Sato et al. |
| 2003/0016253 A1 | 1/2003 | Aoki et al. |
| 2003/0046401 A1 | 3/2003 | Abbott et al. |
| 2003/0067536 A1 | 4/2003 | Boulanger et al. |
| 2004/0102957 A1 * | 5/2004 | Levin .................. G06F 17/2735 704/3 |
| 2004/0113867 A1 | 6/2004 | Tomine |
| 2004/0193413 A1 | 9/2004 | Wilson et al. |
| 2004/0210852 A1 | 10/2004 | Balakrishnan et al. |
| 2004/0267527 A1 * | 12/2004 | Creamer .................. G10L 15/26 704/235 |
| 2005/0114140 A1 | 5/2005 | Brackett et al. |
| 2005/0237296 A1 | 10/2005 | Lee |
| 2005/0245292 A1 * | 11/2005 | Bennett ................ H04B 1/1615 455/574 |
| 2005/0261890 A1 * | 11/2005 | Robinson .............. G06F 17/289 704/9 |
| 2006/0010368 A1 | 1/2006 | Kashi |
| 2006/0028400 A1 | 2/2006 | Lapstun et al. |
| 2006/0061551 A1 | 3/2006 | Fateh |
| 2006/0074624 A1 * | 4/2006 | Sahashi ................. H04M 3/567 704/8 |
| 2006/0109237 A1 | 5/2006 | Morita et al. |
| 2006/0178085 A1 | 8/2006 | Sotereanos et al. |
| 2006/0221266 A1 | 10/2006 | Kato et al. |
| 2007/0009125 A1 | 1/2007 | Frerking et al. |
| 2007/0030174 A1 | 2/2007 | Randazzo et al. |
| 2007/0103388 A1 | 5/2007 | Spitzer |
| 2007/0180979 A1 | 8/2007 | Rosenberg |
| 2007/0220108 A1 | 9/2007 | Whitaker |
| 2007/0265495 A1 | 11/2007 | Vayser |
| 2008/0052643 A1 | 2/2008 | Ike et al. |
| 2008/0055194 A1 | 3/2008 | Baudino et al. |
| 2008/0084992 A1 | 4/2008 | Peddireddy et al. |
| 2008/0120141 A1 | 5/2008 | Karuathungal et al. |
| 2008/0144854 A1 | 6/2008 | Abreu |
| 2008/0180640 A1 | 7/2008 | Ito |
| 2008/0200774 A1 | 8/2008 | Luo |
| 2008/0239080 A1 | 10/2008 | Moscato |
| 2009/0002640 A1 | 1/2009 | Yang et al. |
| 2009/0079839 A1 | 3/2009 | Fischer et al. |
| 2009/0093304 A1 | 4/2009 | Ohta |
| 2009/0099836 A1 | 4/2009 | Jacobsen et al. |
| 2009/0117890 A1 | 5/2009 | Jacobsen et al. |
| 2009/0182562 A1 | 7/2009 | Caire et al. |
| 2009/0204410 A1 * | 8/2009 | Mozer .................... G10L 15/30 704/275 |
| 2009/0213071 A1 | 8/2009 | Wang et al. |
| 2009/0240488 A1 * | 9/2009 | White .................. G06F 3/0236 704/9 |
| 2009/0251409 A1 | 10/2009 | Parkinson et al. |
| 2010/0106497 A1 * | 4/2010 | Phillips .................. G10L 15/30 704/231 |
| 2010/0117930 A1 | 5/2010 | Bacabara et al. |
| 2010/0119052 A1 | 5/2010 | Kambli |
| 2010/0128626 A1 | 5/2010 | Anderson et al. |
| 2010/0141554 A1 | 6/2010 | Devereaux et al. |
| 2010/0156812 A1 | 6/2010 | Stallings et al. |
| 2010/0164990 A1 | 7/2010 | Van Doorn |
| 2010/0169073 A1 * | 7/2010 | Almagro ................. G10L 15/26 704/3 |
| 2010/0182137 A1 | 7/2010 | Pryor |
| 2010/0204981 A1 * | 8/2010 | Ribeiro ................ G06F 17/289 704/8 |
| 2010/0235161 A1 * | 9/2010 | Kim ........................ G10L 15/26 704/3 |
| 2010/0245585 A1 | 9/2010 | Fisher et al. |
| 2010/0250231 A1 * | 9/2010 | Almagro ............... G06F 17/289 704/2 |
| 2010/0302137 A1 | 12/2010 | Benko et al. |
| 2010/0309295 A1 | 12/2010 | Chow |
| 2011/0001699 A1 | 1/2011 | Jacobsen et al. |
| 2011/0092825 A1 | 4/2011 | Gopinathan et al. |
| 2011/0134910 A1 * | 6/2011 | Chao-Suren .......... G06F 17/289 370/352 |
| 2011/0187640 A1 | 8/2011 | Jacobsen et al. |
| 2011/0238405 A1 * | 9/2011 | Pedre .................... G06F 17/289 704/3 |
| 2012/0068914 A1 | 3/2012 | Jacobsen et al. |
| 2012/0075177 A1 | 3/2012 | Jacobsen et al. |
| 2012/0089392 A1 | 4/2012 | Larco et al. |
| 2012/0110456 A1 | 5/2012 | Larco et al. |
| 2012/0236025 A1 | 9/2012 | Jacobsen et al. |
| 2012/0287284 A1 | 11/2012 | Jacobsen et al. |
| 2013/0174205 A1 | 7/2013 | Jacobsen et al. |
| 2013/0231937 A1 | 9/2013 | Woodall et al. |
| 2013/0288753 A1 | 10/2013 | Jacobsen et al. |
| 2013/0289971 A1 | 10/2013 | Parkinson |
| 2013/0300649 A1 | 11/2013 | Parkinson et al. |
| 2014/0223299 A1 | 8/2014 | Han |
| 2014/0235169 A1 | 8/2014 | Parkinson et al. |
| 2014/0368412 A1 | 12/2014 | Jacobsen et al. |
| 2015/0072672 A1 | 3/2015 | Jacobsen et al. |
| 2015/0279354 A1 * | 10/2015 | Gruenstein ............. G10L 15/22 704/235 |

FOREIGN PATENT DOCUMENTS

| | | |
|---|---|---|
| CN | 101243392 A | 8/2008 |
| CN | 101349944 A | 1/2009 |
| CN | 101581969 A | 11/2009 |
| CN | 101599267 A | 12/2009 |
| CN | 101620511 A | 1/2010 |
| DE | 103 44 062 A1 | 4/2005 |
| EP | 2 207 164 A2 | 7/2010 |
| JP | 2001-100878 A | 4/2001 |
| JP | 2001-506389 A | 5/2001 |
| JP | 2001-216069 A | 8/2001 |
| JP | 2002-525769 A | 8/2002 |
| JP | 2008-052590 A | 3/2008 |
| JP | 2009-179062 A | 8/2009 |
| WO | WO 99/01838 | 1/1999 |
| WO | WO 00/17848 | 3/2000 |
| WO | WO 2005/017729 A2 | 2/2005 |
| WO | WO 2009/120984 A1 | 10/2009 |
| WO | WO 2010/129679 A1 | 11/2010 |
| WO | WO 2011/097226 A1 | 8/2011 |
| WO | WO 2011/114149 | 9/2011 |

OTHER PUBLICATIONS

International Preliminary Report on Patentability and Written Opinion, PCT/US2011/023337, mailing date, "Wireless Hands-Free

(56) References Cited

OTHER PUBLICATIONS

Computing Headset with Detachable Accessories Controllable by Motion, Body Gesture and/or Vocal Commands", Aug. 16, 2012, 8 pages.

International Search Report and Written Opinion for PCT/US2013/065927 dated Mar. 21, 2014, entitled "Improved Headset Computer Operation Using Vehicle Sensor Feedback for Remote Control Vehicle".

Morphew, M.E., et al., "Helmet Mounted Displays for Unmanned Aerial Vehicle Control", Proceedings of SPIE, vol. 5442, Oct. 20, 2004.

Notification Concerning Transmittal of International Preliminary Report on Patentability of PCT/US2012/037284, "Headset Computer That Uses Motion and Voices to Control Information Display and Remote Devices", Date of Mailing: Nov. 21, 2013, 7 pages.

International Preliminary Report on Patentability, PCT/US2013/037988, "Instant Translation System", Date of Mailing: Nov. 6, 2014.

European Search Report for EP 12782481.1 dated Sep. 29, 2014.

EP 12782481.1 Supplemental European Search Report, "Context Sensitive Overlays in Voice Controlled Headset Computer Displays," dated Sep. 29, 2014.

Notification of Transmittal of International Search Report and Written Opinion of PCT/US2012/037284 dated Oct. 1, 2012.

Notification of Transmittal of International Search Report and Written Opinion of PCT/US2012/068686 dated Mar. 25, 2013.

* cited by examiner

INSTANT TRANSLATION SYSTEM

RELATED APPLICATION(S)

This application claims the benefit of U.S. Provisional Application No. 61/638,419 filed Apr. 25, 2012 and U.S. Provisional Application No. 61/660,478, filed on Jun. 15, 2012. The entire teachings of the above applications are incorporated herein by reference.

BACKGROUND OF THE INVENTION

The present application relates to human/computer interfaces and more particularly to a headset computing device that accepts voice commands and tracks head motions to provide command inputs to and receive display information from an executed software application.

Mobile computing devices, such as notebook personal computers (PC's), Smartphones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such devices is limited to promote mobility. Another drawback of the aforementioned device types is that the user interfaces are hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY OF THE INVENTION

Embodiments of the present invention provide automatic instant translation from a source or first language to a target or second language using a headset computer free of user hand-entered input. The headset computer employs an automated instant translation processing wherein an automated process for instant translation can be based on the current environment and a predefined user language, for example default or preferred language settings. Thus, the user is not required to provide comment or parameter inputs (voice or key-in) in a request to translate; rather, the instant translation can be based on the current environment and predefined user (language default or preference) settings once a single confirmation to start the process is provided by the user.

Example embodiments include a method of performing instant speech translation including, establishing a local communications network including a link between at least a first and a second headset computer, capturing speech in a first language at the first headset computer, transmitting the captured speech in the first language from the first headset computer to a network-based speech recognition service to recognize and transcribe the captured speech as text in the first language, receiving the text in the first language at the first headset computer from the network-based speech recognition service, broadcasting the text in the first language over the local network to at least the second headset computer, receiving the text in the first language at the second headset computer, transmitting the received broadcast text in the first language from the second headset computer to a network-based text translation service to translate the text in the first language to a text in a second language, receiving the text in the second language at the second headset computer from the network-based text translation service, and displaying the text in the second language on a display of the second headset computer.

Example embodiments can further include, synthesizing speech from the text in the second language at the second headset computer and presenting the synthesized speech through an audio speaker of the second headset computer, setting the first and second languages as a preferred operating language of the first and second headset computers, respectively, prior to establishing the local communications network. The establishing a local network can further includes broadcasting interrogatories including the preferred operating language of each headset computer.

Example embodiments can further include selecting an on-screen option using at least a voice command, head-motion command, hand-gesture command, or a combination thereof, to start the method of instant speech translation. The local communications network can use a Bluetooth Personal Area Networking (PAN) Profile. The local communications network can further include a communications link between at least one headset computer and at least one host device, the host device operating as a relay between the at least one headset computer and the network-based speech recognition service and the network-based text translation service. The host device can further include a display to present the text in the second language. The host device can further include at least a short-range radio and a long-range radio, the host device can use the short-range radio for the local communications network including the communications link with the at least one headset computer and the long-range radio to access the network-based speech recognition service and the network-based text translation service. The long-range radio can be a 3G cellular radio, such as a Global System for Mobile (GSM), Code Division Multiple Access (CDMA), or 4G Long-Term Evolution (LTE) radio.

Further example embodiments include a headset computing device to perform instant speech translation, the device can include, a speech capture module to capture speech in a first language, a communications module to establish a local communications network including a link with at least a second headset computer, transmit the captured speech in the first language to a network-based speech recognition service to recognize and transcribe the captured speech as text in the first language, receive the text in the first language from the network-based speech recognition service, and broadcast the text in the first language over the local network to the at least second headset computer, receive text in a second language from the at least second headset computer, transmit the received text in the second language to a network-based text translation service to translate the text in the second language to a text in the first language, and receive the text in the first language from the network-based text translation service, and a micro-display to display the translated text in the first language.

Example embodiments can further include a speech synthesizer to synthesize the text in the first language, and an audio speaker to play the synthesized speech, a preferred operating language, the preferred operating language being set during an initial set-up of the headset computer and at least prior to establishing the local communications network.

The communications module can broadcast interrogatories including the preferred operating language of the headset computer as part of establishing the local communications network including the link with the at least second headset computer.

Example embodiments can further include an on-screen option to start the method of instant speech translation, the on-screen option being selected by at least a voice command, head-motion command, hand-gesture command, or a combination thereof. The communications module can use a Bluetooth PAN Profile to establish the local communications network. The communications module can further establish a communications link with at least one host device over the local communications network, the host device can operate as a relay between the headset computer and the network-based speech recognition service and the network-based text translation service. The host device can further include a display to present the text in the second language. The communications module can further include at least a short-range radio and a long-range radio, the host device using the short-range radio for the local communications network including the communications link with the at least one headset computer and using the long-range radio to access the network-based speech recognition service and the network-based text translation service. The long-range radio can be a 3G cellular radio, such as GSM, CDMA, or 4G LTE radio.

Still further example embodiments can include a non-transitory computer program product for controlling operation of a headset computer, the computer program product comprising a computer readable medium having computer readable instructions stored thereon, which, when loaded and executed by a processor, cause the processor to establish a local communications network including a link between at least a first and a second headset computer, capture speech in a first language at the first headset computer, transmit the captured speech in the first language from the first headset computer to a network-based speech recognition service to recognize and transcribe the captured speech as text in the first language, receive the text in the first language at the first headset computer from the network-based speech recognition service, broadcast the text in the first language over the local network to at least the second headset computer, receive text in a second language from the second headset computer at the first headset computer, transmit the received text in the second language to a network-based text translation service to translate the text in the second language to text in the first language, receive the text in the first language from the network-based text translation service at the first headset computer, and display the text in the first language on a micro-display of the first headset computer.

Still further example embodiments can include a method of performing instant speech translation including, detecting a speech input in a source language at a headset computer, recognizing the detected speech including automatic language identification to identify the source language, transcribing the speech to text in the source language, translating the text to a target language, displaying the text in the target language and/or the source language on a microdisplay coupled to the headset computer, synthesizing speech in the target language from the text in the target language, and playing the synthesized speech using an audio speaker coupled to the headset computer.

Still further example embodiments can include a method of performing instant speech translation including, detecting a text image in a source language using a camera coupled to a headset computer, recognizing the text in the source language using optical character recognition, translating the text is the source language to text in a target language, displaying the text in the target language on a microdisplay coupled to the headset computer, synthesizing speech in the target language from the text in the target language, and playing the synthesized speech using an audio speaker coupled to the headset computer.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

Figure 1:
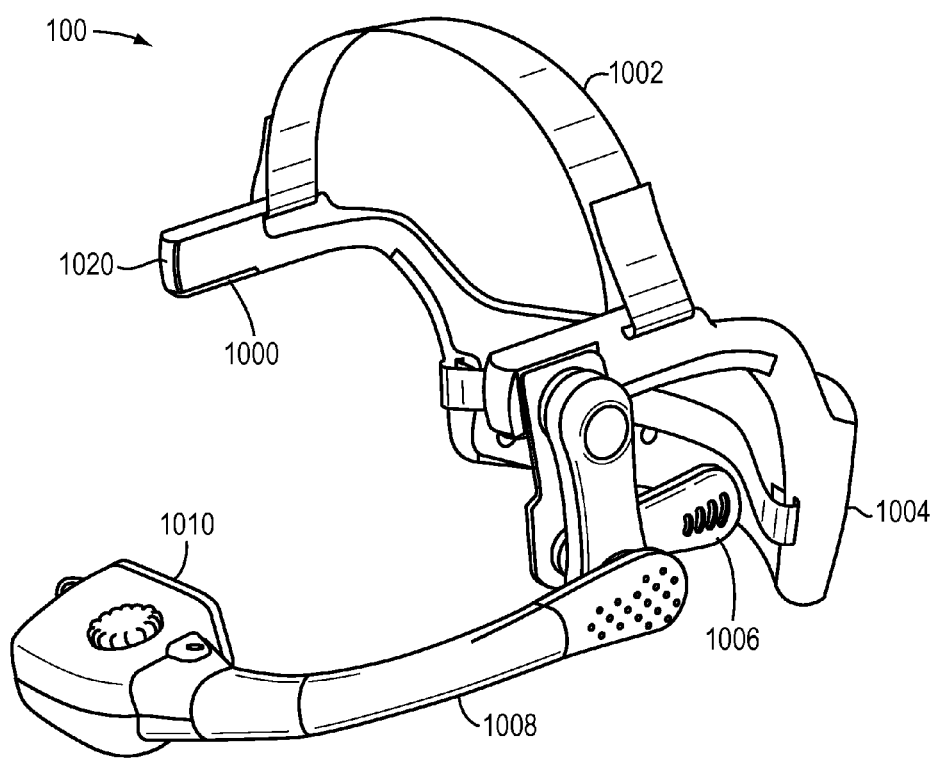
FIGS. 1 and 1A are perspective views of a headset computer employed in embodiments of the invention.

FIG. 1 depicts a headset computer (HC) (alternatively referred to as a wireless hands-free video computing headset, headset computing device, or head-mounted device (HMD)) containing a microdisplay, local processors, wireless transceivers for the communication of data, which may include audio and/or graphical data (the audio and/or graphical data may further include voice and/or video data, respectively). The HC may be further integrated with one or multiple peripheral devices, examples of such integrated peripheral devices include, but are not limited to, microphones, speakers, 3 axis to 9 axis degrees of freedom orientation sensing, geo-positional receivers (GPS), atmospheric sensors, health condition sensors, digital compass (multi-axis magnetometer), flash light, altimeter, pressure sensors, various environmental sensors, personal sensors, energy sensors, optical sensors and/or cameras.

The HC can include one or more microdisplay devices to graphically present information to the user, and can use an input device such as head tracking accelerometers, gyros, or a camera or cameras to detect movements, such as head movements, hand motions and/or gestures, along with optional voice commands, to provide remote control of applications running on either a local processor or a remote host processor in various ways.

The example embodiment depicted in FIG. 1 shows a HC 100 (also referred to herein as device 100) that incorporates a microdisplay (WQVGA or better) element 1010 and other features described below. Input and/or output devices, including one or more microphone(s), input and output speaker(s), geo-positional sensing, 3 axis to 9 axis degrees of freedom orientation sensing, atmospheric sensors, health condition sensors, GPS, digital compass, pressure sensors, environmental sensors, energy sensors, acceleration, position, altitude, motion, velocity or optical sensors, cameras (visible light, infrared (IR), ultra violet (UV), etc.), additional wireless radios (Bluetooth®, Wi-Fi®, 3G or 4G LTE Cellular, FM, etc.), auxiliary lighting, range finders, or the like, and/or an array of sensors embedded in the headset and/or attached to the device via one or more peripheral ports to control operation of the HC 100 and other devices. (Bluetooth is a registered trademark of Bluetooth Sig, Inc., of Kirkland Wash.; Wi-Fi is a registered trademark of Wi-Fi Alliance Corporation of Austin Tex.)

Also typically located within the housing of the HC 100 are various electronic circuits including, as will be understood shortly, a microcomputer (single or multi-core), one or more wired or wireless interfaces, and/or optical interfaces, associated memory and/or storage devices, various sensors, and a peripheral mount or mounts such as a "hot shoe" 1020.

FIG. 1 is a perspective view showing some details of an example embodiment of the headset computer (HC) 100. The HC 100 includes generally a frame 1000, a strap 1002, a back section 1004, speaker 1006, cantilever or arm 1008 and microdisplay subassembly 1010.

Figure 1A:
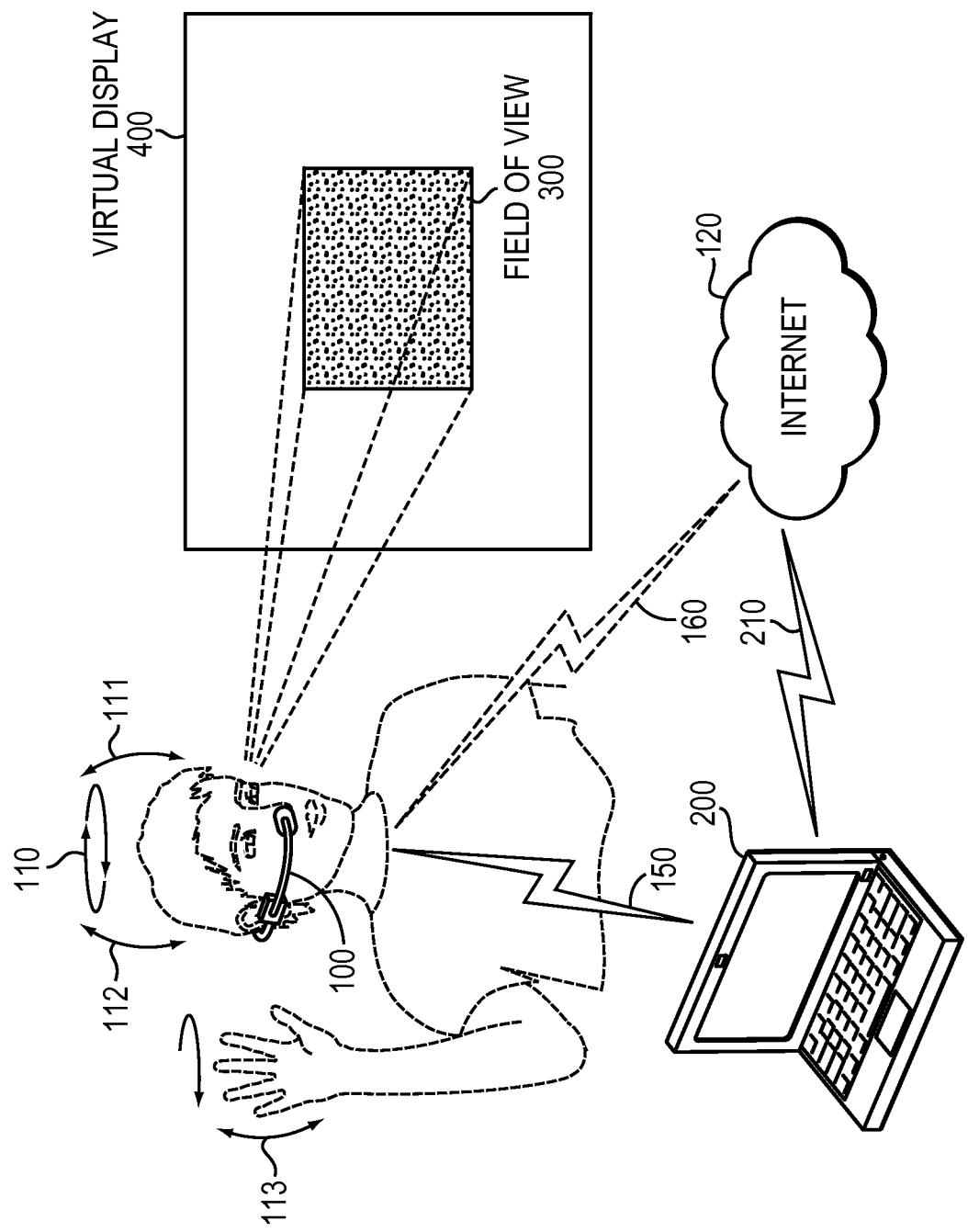

FIG. 1A illustrates an example of the various ways the HC 100 can be used. The HC 100 can be used as a remote display for a streaming video signal provided by a remote host computing device 200 (also referred to as a remote computing device 200). The host 200 may be, for example, a laptop, cell phone, BlackBerry®, iPhone®, cloud-based server, or even another HC 100, or any other computing device having lesser or greater computational complexity than the wireless remote control HC 100. The host 200 may be further connected to other networks such as through a wired or wireless connection 210 to the Internet 120. Additionally, the HC 100 can be further connected to other networks such as through a wired or wireless connection 160 to the Internet 120. The HC 100 and host 200 are connected to each other and/or other networks via one or more suitable wireless connections, such as provided by a Bluetooth, Wi-Fi, cellular, LTE, WiMax or other wireless radio link 150. (BlackBerry is a registered trademark of Research in Motion Limited, 295 Phillip St. Waterloo, Ontario, Canada; iPhone is a registered trademark of Apple Inc., 1 Infinite Loop, Cupertino, Calif.)

The HC 100 can also be used as a remote control for the host 200. For example, the HC 100 can allow a user to select a field of view 300 within a much larger area defined by a virtual display 400 on host 200. The user can typically control the position, extent (e.g., X-Y or 3D range), and/or magnification of the field of view 300 using head movements or hand movements or body gestures or in other ways, such as with vocal commands as detected by the HC 100. The HC 100 thus can have specialized user input peripherals and processing to, for example, pan and zoom and control the field of view of the display.

Also located within HC 100 are circuits including, as will be understood shortly, a microcomputer (single or multi-core), one or more wireless interfaces, associated memory or other storage devices, one or more cameras (optical sensors) and/or various sensors previously mentioned. The camera(s), motion sensor(s) and/or positional sensor(s) are used to track the motion and/or position of the user's head at 110, 111, 112, hands at 113 and/or body in at least a first axis 110, 111 (horizontal), but preferably also a second (vertical) 112, third (depth) 113, fourth (pitch), fifth (roll) and sixth (yaw). A three axis magnetometer (digital compass) can be added to provide the wireless computing headset or peripheral device with a full 9 axis degrees of freedom positional accuracy.

The HC 100 also includes at least one microphone and corresponding electronics such as memory or other storage device and/or programmable processors for speech recognition. The HC 100 detects a user's voice, and using speech recognition techniques, derives commands and/or dictations. The HC 100 uses the commands derived from the speech recognition to perform functions indicated by the commands.

In one example embodiment, two or more HCs 100 can perform instant translation from a first spoken human language (i.e., a source language) to a second spoken human language (i.e., a target language). Such an example enables two or more users of the HCs 100 to communicate with each other while each user is speaking a different language and maintain eye contact with the person to whom the user is speaking Formats of the translation can include from speech in a first (source) language to text and speech in a second (target) language or vice-versa.

Figure 2:
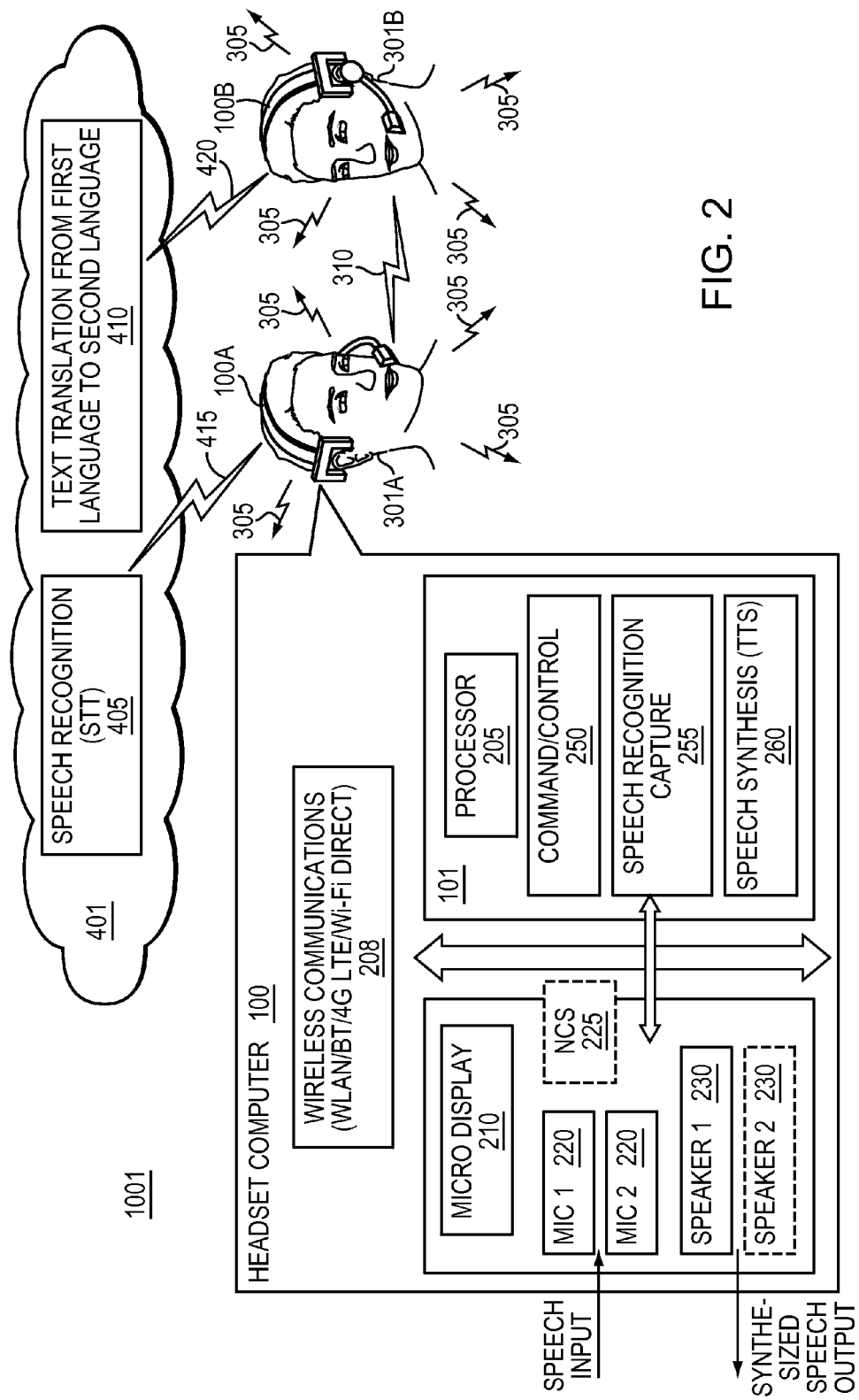
FIG. 2 is a schematic illustration of an embodiment of the present invention.

FIG. 2 illustrates an example embodiment of instant translation that includes establishing a communications link between two or more HCs 100 together and a link between each HC 100 and cloud-based network resources 401. HC 100 can be comprised of a micro-display 210, one or more microphones (mic 1 and mic 2) 220, one or more audio speakers (speaker 1 and speaker 2) 230, main board 101 further comprised of operatively coupled processor 205, noise canceling module (NCS) 225, command-and-control module 250, speech recognition capture module 255, speech synthesis module 260, and wireless communications module 208. HC 100 can be further comprised of additional elements that enable instant speech translation according to principals of the present invention.

Furthermore, in some embodiments of HC 100, the user can customize the configuration and operation of the HC 100 for a preferred performance. Customization can include setting a first language as a preferred operating language of the HC 100, prior to establishing the local communications network for an instant translation session. For example, the preferred (or default) language can be set during the initial installation and configuration of a computer software application product on the HC 100. As will be understood, the preferred language can be the source language in some instances, such as when the user of the HC 100 is speaking, or the target language, such as when the HC 100 receives text in a language other than the preferred language.

Communication between HC 100 and cloud-based network resources 401 can be enabled by various methods of wireless communication using a peripheral host device 200, such as a smart phone, as a wireless relay. In some embodiments, the HC 100 can communicate directly with cloud-based network resources 401 using various methods of wireless communication, such as Wi-Fi, 3G (GSM, CDMA, etc.) or 4G LTE cellular, or WiFi-Direct. Cloud-based network resources 401 can include cloud-based speech recognition/dictation module 405 and text translation module 410.

FIG. 2 illustrates an example embodiment of instant translation includes establishing a communications link between two or more HCs 100 together and a link between each HC 100 and cloud-based network resources 401. A local communications network that includes a communications link between each HC 100 can be established. A short-range radio, using protocol such as Bluetooth Personal Area Networking (PAN) Profile, can be used for the local network. Included in the interrogatory messaging can be data indicating the preferred (or default) language setting of each HC 100. For example, consider the two HCs 100A and 100B of FIG. 2; HC 100A is used by an English speaker 301A (also referred to as a user) and configured to listen for (i.e., recognize) English speech, while HC 100B is used by a French speaker 301B (also referred to as a user) and configured to listen for French speech. In other words, the speech recognition capture module 255 is configured via software to recognize the speech of the respective user of each HC 100.

During the initial set-up of a software product application installed or executed by the HCs 100 the preferred language can be set by a user so that the preferred language setting is referred to and used in the automatic instant speech translation without additional user input, other than confirming a request to start a instant translation session, prior to that session.

Also illustrated in FIG. 2, each HC 100A and 100B continuously transmits short range (i.e., approximately 100 feet or less) network interrogatories 305, such as Bluetooth registration packets. Such network interrogatories allow HC 100A and 100B to form a local network 310 when the devices are within the transmission range instantly and automatically, without effort by the respective users 301A and 301B. The interrogatories 305 carry and provide identifying data of the respective HCs 100 such as a preferred or default language, and other operating characteristics. Upon identifying and forming such a network 310, HC 100A is made aware not only that HC 100B is near-by, but that HC 100B is configured for a French-speaking user 301B. Similarly, upon identifying and forming such a local communications network 310, HC 100B is aware that HC 100A is near-by and configured for an English-speaking user 301A. Further, each HC 100 (100A and 100B) provides options for each user to allow an instant speech translation session to begin. For example, the HC 100 may present an on-screen option for commencing an instant translation session to the user through the microdisplay. The user can confirm or reject the instant translation session request using a voice, head-motion, hand-gesture command, or some combination thereof.

Once each user 301A and 301B has enabled the instant speech translation session, the session can begin. For example, English-speaker 301A speaks a phrase in English into the device 100A. HC 100A uses a speech recognition capture module 255 in conjunction with microphone(s) 220 to capture the English speech audio input. The captured speech is transmitted to the cloud-based speech recognition service 405 via a network connection 415, such as Wi-Fi or 4G LTE, using the wireless communications module 208. The cloud-based speech recognition service 405 returns (via connection 415) the speech audio input as written English text to HC 100A, typically within less that a few seconds.

The returned written English text is then transmitted by the first headset computer, HC 100A, to the second headset computer, HC 100B, over local network link 310, which can be for example a Bluetooth connection. After receiving the written English text, the HC 100B transmits (over network connection 420 using wireless communication module 208) the written English text to the cloud-based text translation service 410 so that the written English text can be translated into written French text. Once the cloud-based text translation service 410 completes translating the received written English text into written French text, the written French text is returned to the HC 100B over network connection 420. Upon receiving the written French text, HC 100B displays the written French text on its microdisplay 210 and speech synthesis module 260 is used in conjunction with the audio speaker(s) 230 to produce corresponding synthesized speech in French.

Those of skill in the art will recognize that the process can be alternated so that French speech (by French user 301B) is translated into English text and speech (at English user 301 end) so that two-way translation service is achieved. Those of skill in the art will further recognize that the above described method can be extended to multiple HCs 100 such that a group translated audio broadcast system is achieved. In other words, for example, English speaker 301A can speak in English and broadcast the written English text to multiple other HCs 100, each of which may be configured for a different language, thus establishing a multi-lingual instant translation system. Each HC 100 receives the written English text (e.g., source language text or first language (Language 1)) and independently translate the written English text into the appropriate language (e.g., target language or second language (or third or more, e.g., Language 2 or 3, etc.)) different from the first/source/one language according to each HCs preferred (or default) language configuration for visual display and synthesized speech.

Figure 3:
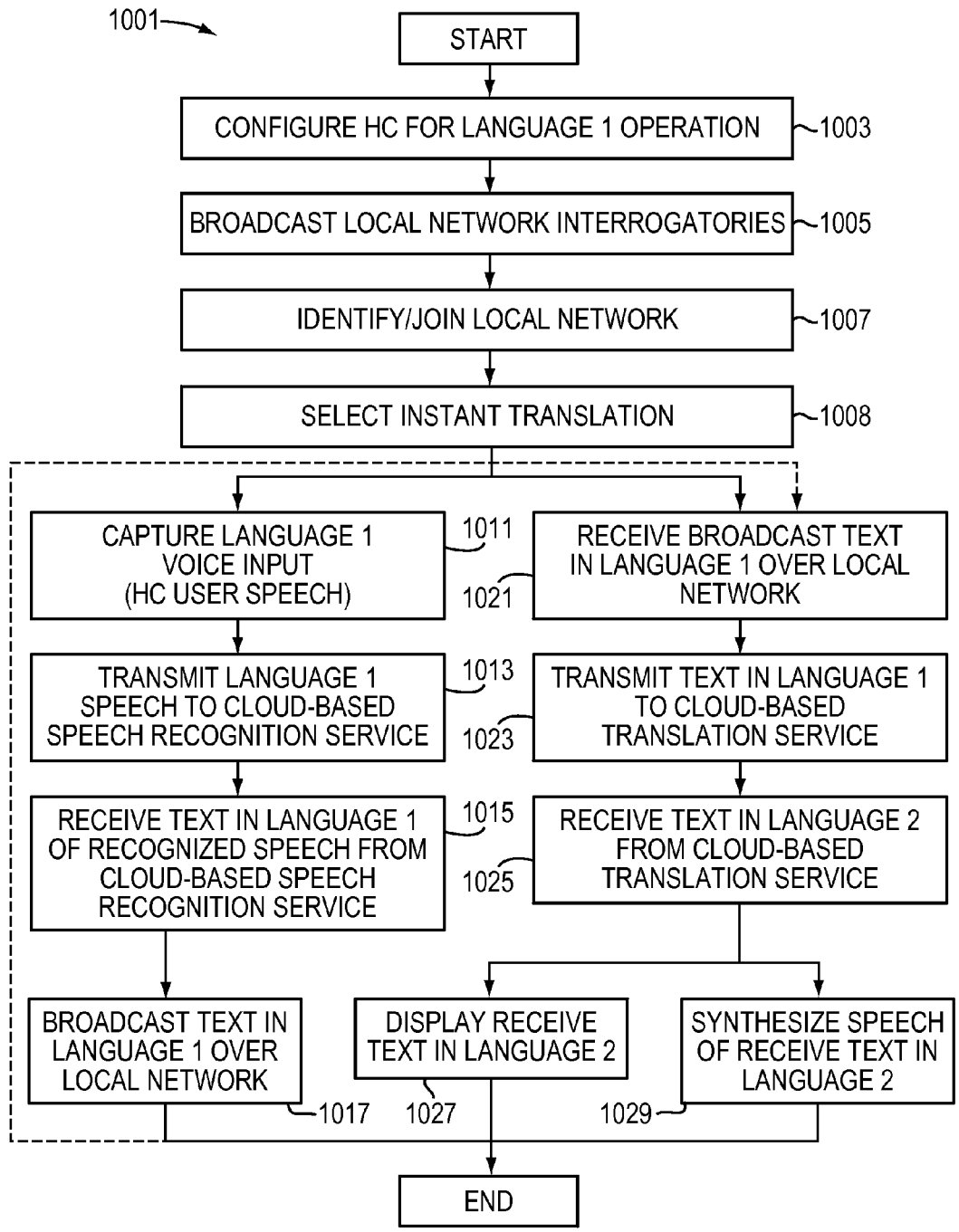
FIG. 3 is a flow diagram of instant translation embodiments.

FIG. 3 is a flow diagram of example procedure that a HC 100 performs in an instant translation system 1001 according to the present invention. After starting, a HC 100A is configured for operation in a first language (Language 1) at 1003. Next, at 1005 the HC 100A broadcasts interrogatories 305 over a local network, such as Bluetooth registration packets. Upon identifying a local network consisting of at least one additional HC, such as HC 100B, HC 100A and HC 100B form or join 1007 a local network, such as a local Bluetooth network 310. Next, the users of HC 100A and HC 100B (users 301A and 301B) select to begin an instant translation session 1009 on their respective HCs 100. For example, each user 301A and 301B, uses a voice, head-motion, hand gesture command, or any combination thereof, to confirm the instant translation session in response to an on-screen option.

During and initial software application product installation, a HC 100 can be configured so that a first language (Language 1) is the preferred language, step 1003. While the HC 100 is operational, local network interrogatories that include the preferred language setting can be broadcast, step 1005. When the HC 100 is within range (short-range, for example under 100 feet) of another (second) HC 100, a local communications network is identified and established, step 1007. Next, an on-screen (and/or audio) prompt is presented to the user to start an instant translation session, step 1008.

The following will be described from the view of the user of HC 100A initiating a conversation with the user of HC 100B. At 1011, HC 100A captures voice input, i.e., speech by user 301A, in a first language. Next, step 1013 transmits the captured speech to a cloud-based speech recognition service 401, 405, over a network connection, such as Wi-Fi or 4G LTE. The speech recognition service 405 transcribes recognizes speech into text in the first language and returns the transcribed text in the first language to the HC 100A. In response, the HC 100A receives 1015 and then broadcasts 1017 the transcribed text as text data in the first language over the local network 310, such a local network can be a Bluetooth local network.

HC 100B can then receive the broadcast text in the first language at 1021. Next, HC 100B transmits 1023 the text in the first language to a cloud-based translation service 410 to be translated into text in a second language. Cloud-based translation service 410 returns translated text in the second language to HC 100B (at 1025). HC 100B then displays 1027 the received text translated into the second language on the microdisplay 210, 1010 and synthesizes speech 1029 (e.g., reads, narrates, recites, enunciates in an automated manner) the text in the second language to the user 301B using audio speakers 230 at HC 100B.

Those of skill in the art will recognize that each HC 100 can perform the above described procedures and that the procedures will alternate and enable users 300A and 300B to converse.

Advantages of above described instant translation system 1001 include the fact that it is often very useful to be able to view the incoming text rather than rely solely on text to speech synthesis only. Particularly, if one wants to refer to previous remarks in an ongoing conversation. Furthermore, locating the microdisplay 210, 1010 in a location near the eye but not occluding the vision of the user allows the user to maintain eye contact with the person with whom the user is having a conversation, and thus, enabling the user to adhere to a fundamental rule of interpersonal communication—maintaining eye-contact.

In other embodiments instant translation from language (first or source) language to (second or target) language is performed following the principals of the present invention. Instant translation can include instant speech translation, the conversion of one spoken human language to another spoken human language, in multiple formats, including translation from speech to speech (STS), speech to text (STT), text to speech (TTS), and/or text to text (TTT). In an example embodiment, speech can be detected by one or more microphones operatively coupled to the HC 100 and instantly translated from the original language to a translated language. The translated speech can be presented as text and/or synthesized speech. In another example embodiment, an image containing embedded text can be captured by one or more cameras 160 (FIG. 4) operatively coupled to the HC 100, the embedded text can be recognized and instantly translated from the original language to a translated language. The recognized and translated text can be presented as synthesized speech and/or text.

Those of skill in the art should recognize that instant translation can further enable instant format conversion; converting a detected voice input to text in the same language or converting recognized text to synthesized speech. In other words, an example embodiment can enable hands-free instant STT conversion, i.e., dictation, while a further example embodiment can enable hands-free instant TTS conversion, i.e., synthesized speech reading (enunciating) the recognized text.

Figure 4:
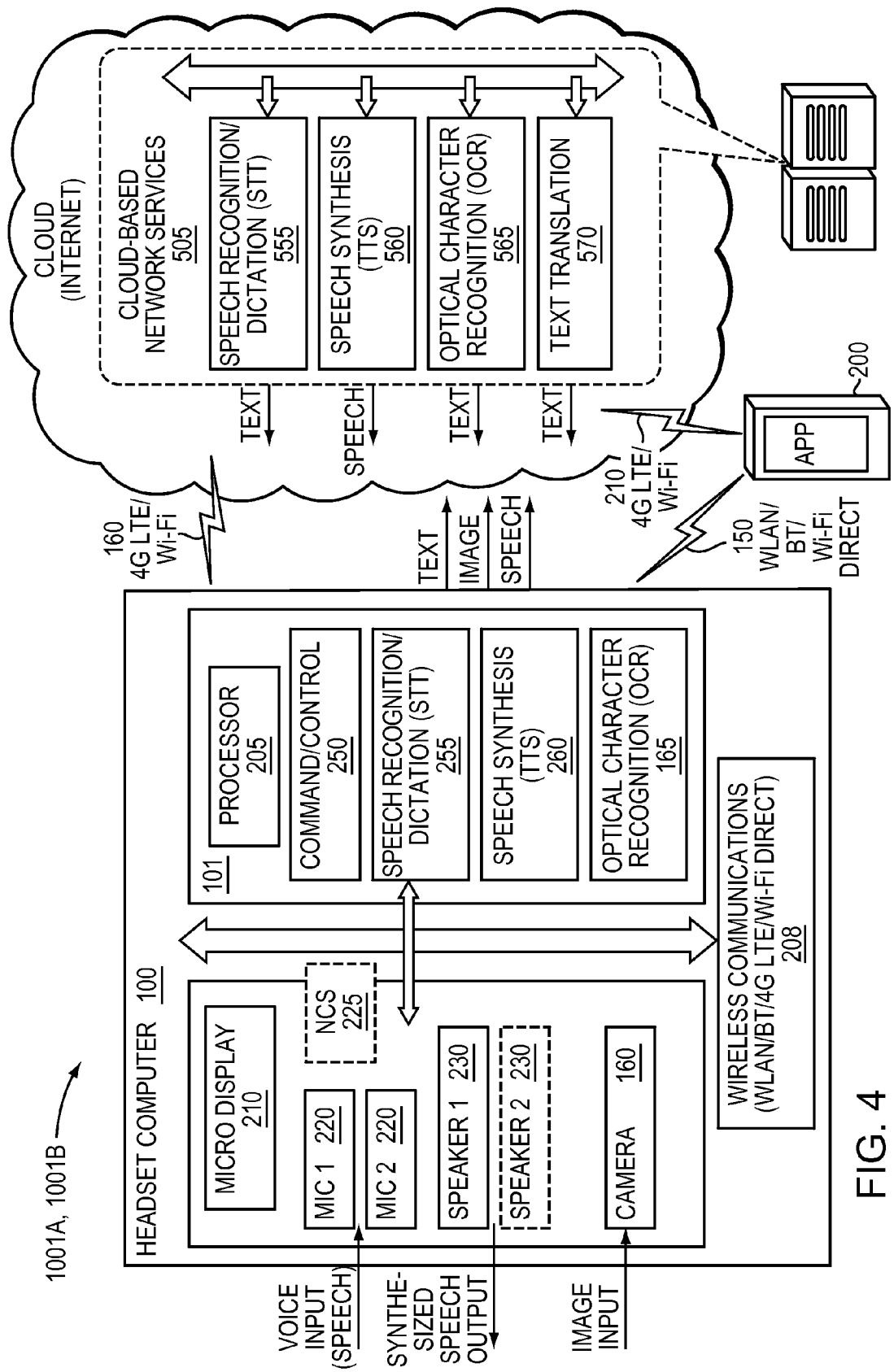
FIG. 4 is a schematic view of another embodiment.

FIG. 4 illustrates another embodiment of the HC 100, peripheral host device 200 and cloud-based network resources 505 used in instant speech translation. The HC 100 can be comprised of a micro-display 210, one or more microphones (mic 1 and mic 2) 220, one or more audio speakers (speaker 1 and speaker 2) 230, camera 160, main board 101 further comprised of operatively coupled processor 205, memory or other storage device (not shown), noise canceling module (NCS) 225, command-and-control module 250, speech recognition/dictation module 255, speech synthesis module 260, optical character recognition (OCR) module 165, and wireless communications module 208. HC 100 can be further comprised of additional elements that enable instant speech translation. Modules 250, 255, 260, 225 are as described above.

Furthermore, in some embodiments of HC 100, the user can customize the configuration and operation of the HC 100 for a preferred performance. Communication between HC 100 and cloud-based network resources 205 can be enabled by various methods of wireless communication using a peripheral host device 200, such as a smart phone, as a wireless relay. In other words, the HCs 100 can form a local communications network including a communications link with the host device 200. The host device can relay the text data in a first or source language (or second or target language) to the network service speech recognition module 555 (or the ext translation module 570). In some embodiments, the HC 100 can communicate directly with cloud-based network resources 505 using various methods of wireless communication, such as Wi-Fi, 3G (GSM, CDMA, etc.) or 4G LTE cellular, or WiFi-Direct as described above in FIG. 2. Cloud-based network resources 505 can include cloud-based speech recognition/dictation module 555, OCR module 565, speech synthesis module 560, and text translation module 570.

In one embodiment, instant speech translation can occur locally at HC 100. Microphones (mic 1 and mic 2) 220 receive voice input, i.e., speech input. A noise cancellation module (NCS) 225 can be used to cancel background noise so that a more accurate representation of the voice/speech input received by microphones 220 can be supplied to local speech recognition module 255. NCS 125 can use any noise cancellation technique, such as active noise cancellation (ANC). Processed or unprocessed (noise cancellation-wise) voice/speech input can be provided to speech recognition/dictation module 255 which then performs speech recognition on the digital audio signal, converting recognized speech to text. Optionally, the transcribed text can be displayed on the micro-display 210, providing a transcript of the recognized speech. The transcribed text can be provided to a local translation module (not shown). The local translation module can translate the transcribed text from one natural language to another, producing translated text. Optionally, the translated text can be displayed on the micro-display 210. The translated text can be supplied to the speech synthesis module 260 and read aloud (enunciated) using one or more audio speakers 230 of HC 100. The local translation module or other modules 250, 255, 260 on main board 101 have a default language setting per user and can automatically determine a target language as a function of the default language.

Example embodiments and customized configurations can include setting different noise level thresholds associated with the different microphones 220 so that speech spoken by a person other than the user/wearer of the HC 100, typically in a second (foreign) language, can be recognized and translated. Some example embodiments may not use any noise cancellation techniques to process the audio signals received while the HC 100 is listening and monitoring the received audio signals for speech. Some example embodiments may use noise cancellation techniques when synthesized speech is read/enunciated to the user/wearer, particularly in an example embodiment of the HC which includes at least one audio speaker 230 for each ear of the user.

In a preferred embodiment, instant speech translation can use cloud-based network resources 505. The HC 100 can communicate via wireless communications module 208 with a peripheral host device 200, such as smart phone, using a known wireless protocol, such as Bluetooth or Wi-Fi Direct. Smart phone 200 can act a as wireless relay, enabling communication between HC 100 and the cloud-based network resources 505. Some embodiments of the HC 100 can include a wireless communications module 208 that includes multiple radios, such as 4G LTE and Wi-Fi, which enable communication with the cloud-based network resources 505 without use of a wireless relay device (e.g., host 200).

Microphones (mic 1 and mic 2) 220 receive voice/audio input, i.e., speech input in one language. A noise cancellation module (NCS) 225 can be used to cancel background noise so that a more accurate representation of the voice/speech input received by microphones 220 can be supplied to local speech recognition module 255. NCS 225 can use any noise cancellation technique, such as active noise cancellation (ANC). Processed or unprocessed voice/speech input in the one (source) language is provided to local speech recognition/dictation module 255. Speech recognition module 255 performs speech recognition on the received digital audio input signal converting recognized speech (in the source language) to text in the source language. The resulting recognized text (in the one/source language) is transmitted to the remote cloud-based translation module 570.

Remote cloud-based translation module 570 translates the received source language text, producing translated text (i.e., translates the text from the one/source language to a second/target language text). The cloud based network server 505 communicates the translated text to the HC 100, for example by host 200 relay. After the translated text is received by the HC 100, processor executes commands to display the received target language text on the micro-display 210. The translated text can then be supplied to the speech synthesis module 260 and read aloud (enunciated) using one or more audio speakers 230 of HC 100. The HC 100 command/control module 250 or the speech/text processing modules (STT 255, TTS 260) may have a default (or preference) language setting per user. In this way, translation requests from HC 100 relayed through host 200 automatically set a target language based on the user default (preference) language setting. The user does not need to insert or otherwise input an indication of target language per translation requests communicated between HCs 100 and cloud based network services 505.

Those of skill in the art will recognize that other configurations in which other processes are offloaded from the HC 100 are possible. For example, the HC 100 can provide various inputs to the cloud-based network resources 505, including, for instance, voice/speech input and an automatic indication (user preferred/default) target language can be provided to cloud-based network speech recognition/dictation module 555 to perform speech recognition on the digital audio signal converting speech to text in the same language. The recognized text can then be processed by the cloud-based network translation module 570 to produce translated text (from the source language automatically to the default target language). The translated text can then be communicated back to the HC 100 where it can be displayed as text on the microdisplay 210 and supplied to the speech synthesis module 260 and read aloud (enunciated) in the target language using one or more speakers 230. The foregoing is automatic in at least the sense of the user not being required to input indication of target language in the instant translation request.

Alternatively, HC 100 can send the detected speech signal (and automatic indication of user target language) to the cloud based speech recognition module 555 which converts recognized speech to text. The recognized text can then be processed by cloud-based network translation module 570 to automatically produce translated text in the target language without (free of) user input of a specific language request. The translated text can then be used by cloud-based network speech synthesis module 560 to produce translated speech in the target language. The translated speech can be sent to HC 100, where after being received, can be played to the user using speakers 230.

Example embodiments enabling instant translation in connection with FIG. 4 will be described below.

In an example embodiment, an image containing embedded text can be captured by camera 160 of HC 100. Recognition of the embedded text can occur locally using OCR module 165. The recognized text (in a source language) can then be provided to local translation module (not shown) to automatically produce translated text in the target language (of the user's preference as indicated by the default language setting). The translated text can be displayed on micro-display 210, and/or spoken to the user using the speech synthesis module 260 and the speakers 230. The foregoing is accomplished 'automatically' meaning free of requiring user input of the target language indication to the instant translation processing.

In a preferred embodiment, the image with embedded text captured by camera 160 can be transmitted from HC 100 to network based OCR module 565 via a peripheral host device 200 acting as a wireless relay, such as the smart phone 200, or directly using the wireless communications module 208. The captured image with embedded text can be sent to the cloud-based network services 505 where recognition of the embedded text can be performed using the cloud-based OCR module 565. The recognized text can then be provided to the cloud-based translation module 570 along with an automatic indication of target language from the HC 100 (supplied from the user preference/default settings) to produce the translated text in the target language. The translated text can then be sent to the HC 100. Once received at the HC 100, the translated text can be displayed on micro-display 210, and/or converted into speech using the local speech synthesis module 260 and enunciated using speakers 230.

Example embodiments of the instant translation processes 1001A, 1001B respectively in connection with FIGS. 5A and 5B will be described next.

Figure 5A:
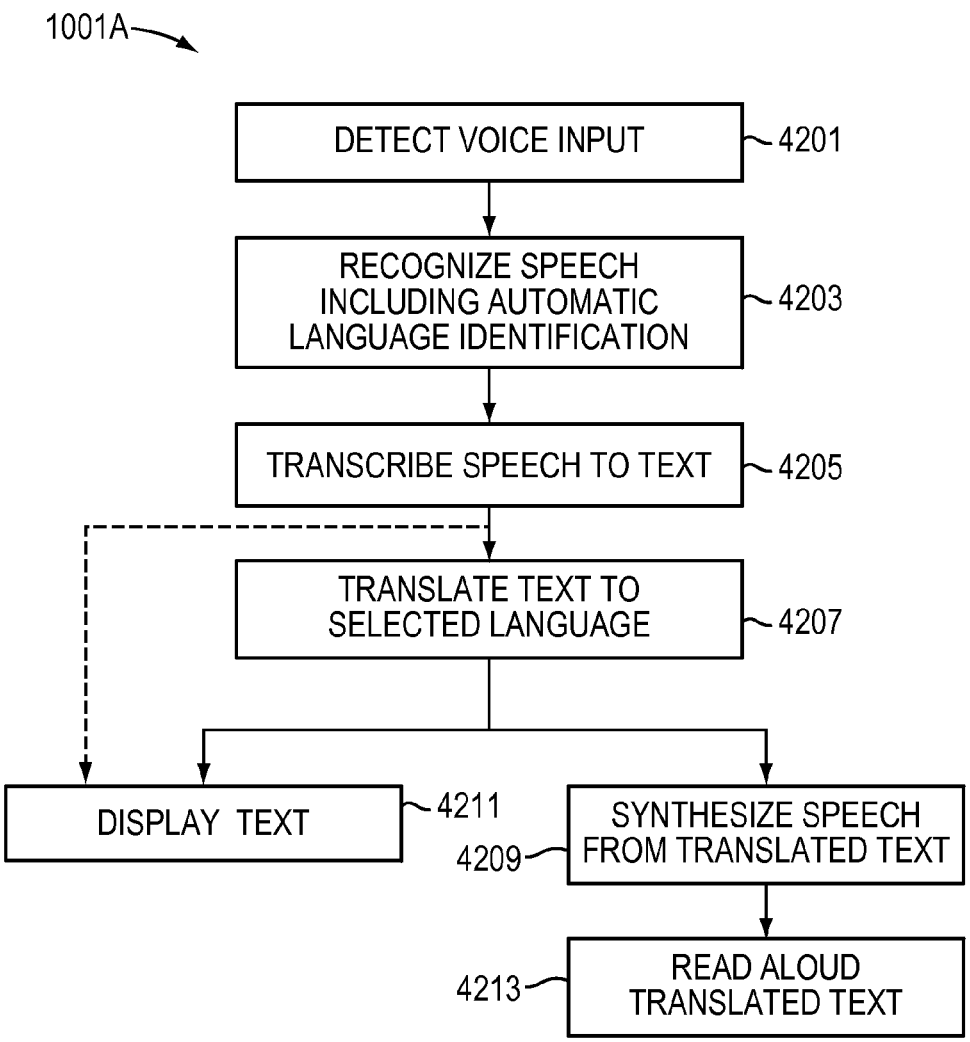
FIGS. 5A and 5B are flow diagrams of the instant translation in the FIG. 4 embodiment.

FIG. 5A depicts an example implementation 1001A of instant translation of speech to speech (STS) and speech to text (STT) of the present invention. The various functions listed in FIG. 5A can be implemented either on-board (i.e., locally) HC 100 or offloaded to other processing devices (i.e., remotely), such as the host 200 or cloud-based networking resources 505 (as shown in FIG. 4). In preferred embodiments, intensive processing (CPU processes) activities and other resource intensive operations are offloaded, so that the HC 100 operates more economically and efficiently. Offloading such processes allows the HC 100 to conserve battery power by exporting the power consumption cost. Further, utilizing network resources to perform such processes allows the HC 100 on-board resource to be reallocated.

The example implementation 1001A of translation of speech to speech (STS) and speech to text (STT) depicted in FIG. 5A starts with detection of voice input through microphones 220, step 4201. Once a voice input is detected, speech contained within the input is recognized, step 4203. Speech recognition can include automatic language identification. The recognized speech can then be transcribed to text step 4205. Once the recognized speech has been transcribed to text, the transcribed text optionally can be displayed to the user (i.e., as a transcript of the dictation) on the micro display 210, at step 4211. Next, the transcribed text can be automatically translated to a pre-selected language (predefined target language), such as the user's preferred language, for example English, at step 4207. The user is not required to input an indication of target language to step 4207, and thus the system 1001A performs instant automatic translation. Once automatically translated (from the source language to the user's default/target language), the translated text optionally can be displayed to the user (i.e., as a translation in the user's preferred language) on the micro display 210, at step 4211. In parallel, at step 4209, the translated text can be synthesized into speech. Once the speech is synthesized, system 1001A can then read aloud (enunciate) the speech corresponding to the translated text to the user at step 4213 through audio speakers 230.

Figure 5B:
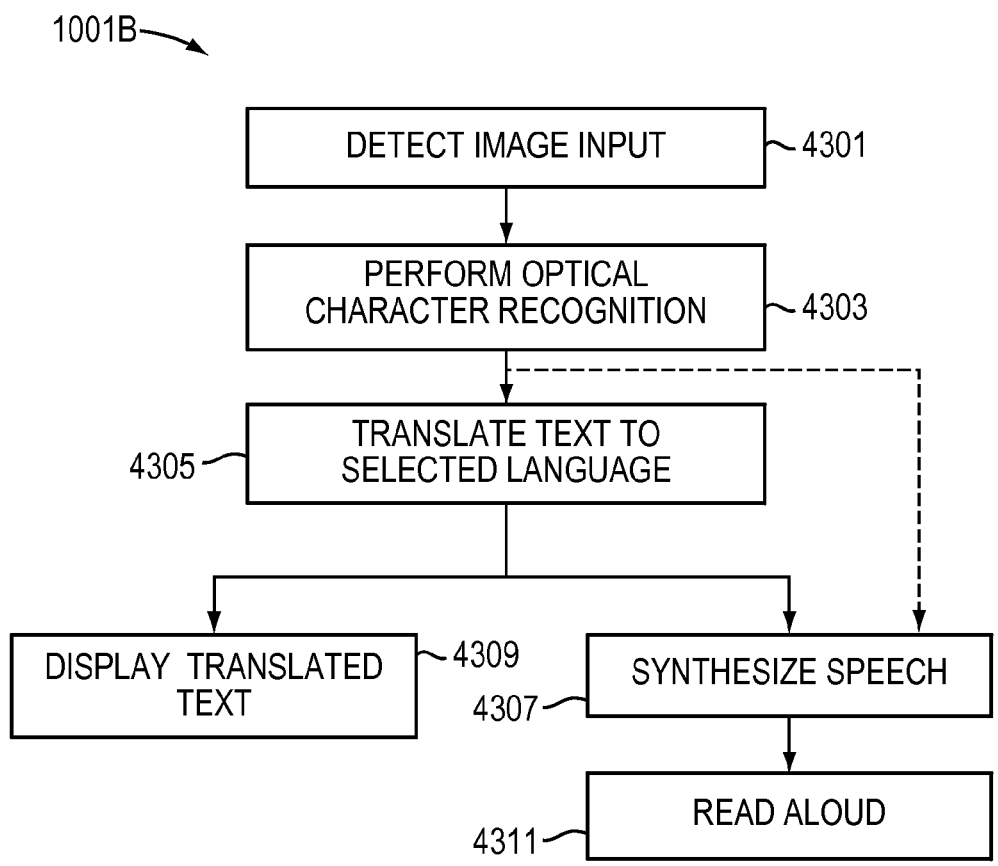

FIG. 5B depicts an example implementation 1001B of instant translation of text to speech (TTS) and text to text (TTT). Similar to the various functions of FIG. 5A, various functions listed in FIG. 5B can be implemented either on-board HC 100 or offloaded to other processing devices, such as host device 200 or cloud-based networking resources 505 (as shown in FIG. 4). In preferred embodiments, the benefits of which are described above with respect to FIG. 5A, intensive CPU processes and other resource intensive operations are offloaded so that HC 100 operates more economically and efficiently.

The example implementation 1001B of instant translation of text to speech (TTS) and text to text (TTT) depicted in FIG. 5B starts with receiving an image input (such as through camera 160), step 4301. Once an image is input, text embedded within the image is recognized, step 4303, using techniques such as optical character recognition (OCR). Once the embedded text is recognized, the embedded text optionally can be synthesized as speech, step 4307, and then read aloud (enunciated) to the user, step 4311 through the audio speakers 230 coupled to the HC 100. Additionally or alternatively, the recognized embedded text can be translated to a pre-selected (or predefined target) language, such as the user's preferred language, for example English, at step 4305. The user is not required to input an indication of target language to step 44305, and thus the system 1001B performs instant automatic translation. Once automatically translated, the translated text optionally can be displayed to the user (i.e., as a translation into the user's preferred/target language) on the micro display 210, at step 4309. In parallel, at step 4307, the translated text can be synthesized into speech. Once the speech is synthesized, system 1001B can then read aloud (enunciate) to the translated text to the user at step 4311, through the audio speakers 230.

Figure 6A:
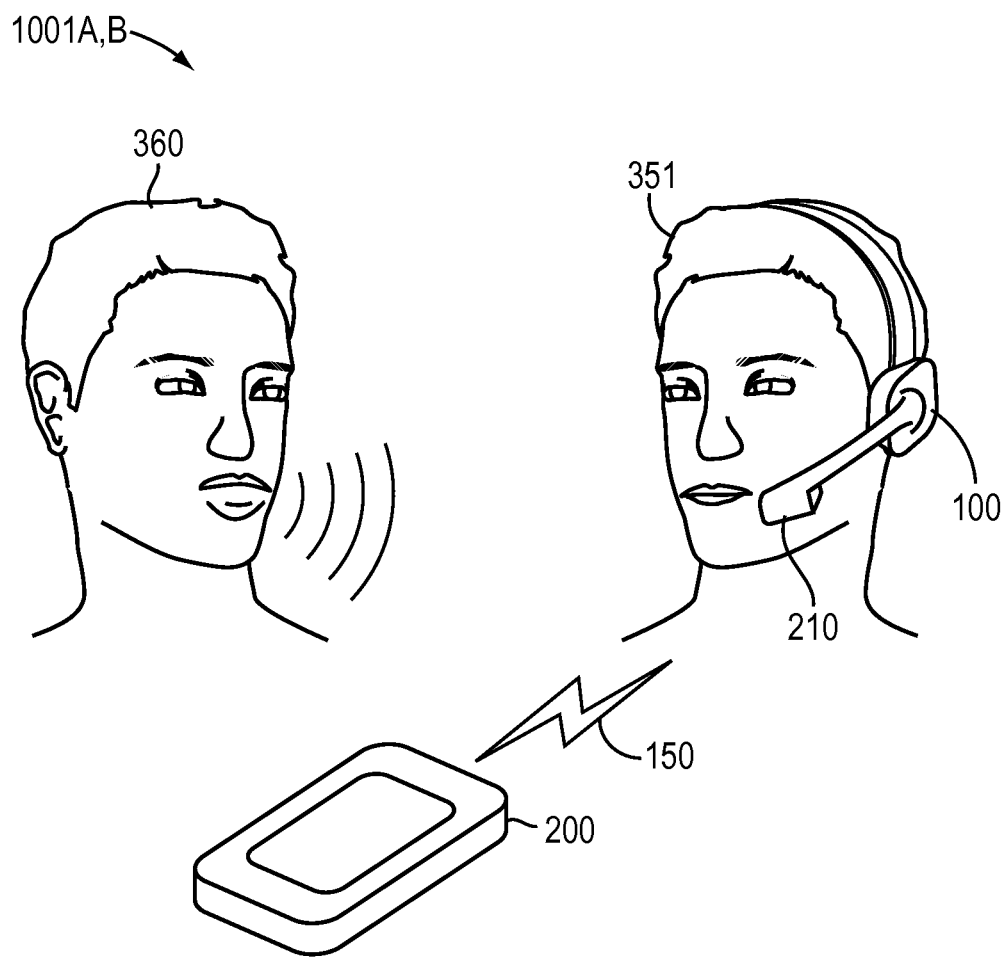
FIGS. 6A and 6B are illustrations of use of the FIG. 4 embodiment.

Systems 1001A, 1001B STS and/or STT translation can be useful in many instances. FIG. 6A illustrates an example, the user 351 or wearer of the HC 100 may be interacting with a person 360 who is only able to speak in a foreign language. System 1001A, 1001B through microphones 220 (shown in FIG. 4) detects and recognizes the speech of the foreign speaker 360, for example Spanish speech, and perform voice recognition on the detected Spanish voice input. The recognized speech then can be translated into a number of languages, including a user's (351) preferred or target language, such as English. Text of the translated speech can be provided to the user 351 at the micro display 210. Alternatively, or additionally, the translated speech can be read over speakers 230 to the user 351 using speech synthesis techniques. An example embodiment of the HC 100 can be equipped with two speakers 230, one for each ear of the user 351, in addition to multiple microphones 220, to provide noise cancellation, optionally by means of active noise cancellation (ANC) 225, such that unwanted environmental sounds, including the speech of the foreign speaker 360, are unheard by the user 351. Such noise cancellation features 225 can be useful so that a user 351 of the HC 100 only hears the system translated speech (synthesized 4209, 4307) and does not hear the foreign speech (person's 360 voice) that is being translated.

Further, the foreign speech that is translated can also be displayed to the user 351 (via microdisplay 210) as text in the foreign (source) language or another language that the user desires. For example, the speech in Spanish can be translated into English and presented as English text.

The instant translation enabled by the HC 100 (system 1001A, B) can be useful for learning foreign languages. In this use case, the 'target' language is a foreign language (different language than the user's default/preferred setting language). For example, the wearer 351 can decide to have the system translate his native language, such as English, into a desired foreign (target) language, such as French. By using the instant translation device 100/system 1001A, B in an every day conversation, the wearer 351 can have English speech (his voice input) translated into French and through speakers 230 hear only French, using ANC 225. Thus the user 351 can immerse him/herself in the (target) language he/she wants to learn. The wearer 351 can also see, through the microdisplay 210, the text of the translated speech to facilitate the learning of the written (target) language. Images, either by themselves or in addition to the text, can also be presented simultaneously with the audio to the user.

In yet another example as illustrated in FIG. 6A, HC 100 can not only output the translated (target) text in the form of audible speech from the HC speaker(s) 230, but the HC 100 may also output the translated (target) text to an external device, such as smart phone 200. For example, the user 351 may arrive in a foreign country and desire to use HC 100 to communicate with a foreign taxi cab driver (e.g. at 360). Instead, of outputting the translated (target) text to the micro display 210 or speech from the speakers 230, the HC 100 can output the translated (target) text to peripheral device 200 associated with the driver 360, such as the taxi cab driver's cell phone. This peripheral device 200 may be operatively coupled to a speaker or a screen capable of displaying text. For example, at the initial outset of use, the HC 100 may include program instructions to interrogate external device(s), such as a monitor, a Personal Digital Assistant, a notebook computer, a portable music player, a remote speaker, a cell phone, smart phone, or any other device having a transceiver or a receiver and that is capable of receiving the wireless communication of data. The HC 100 may pair with the external device 200 using a known protocol standard such as Bluetooth, or any other wireless communication protocol known in the art.

Figure 6B:
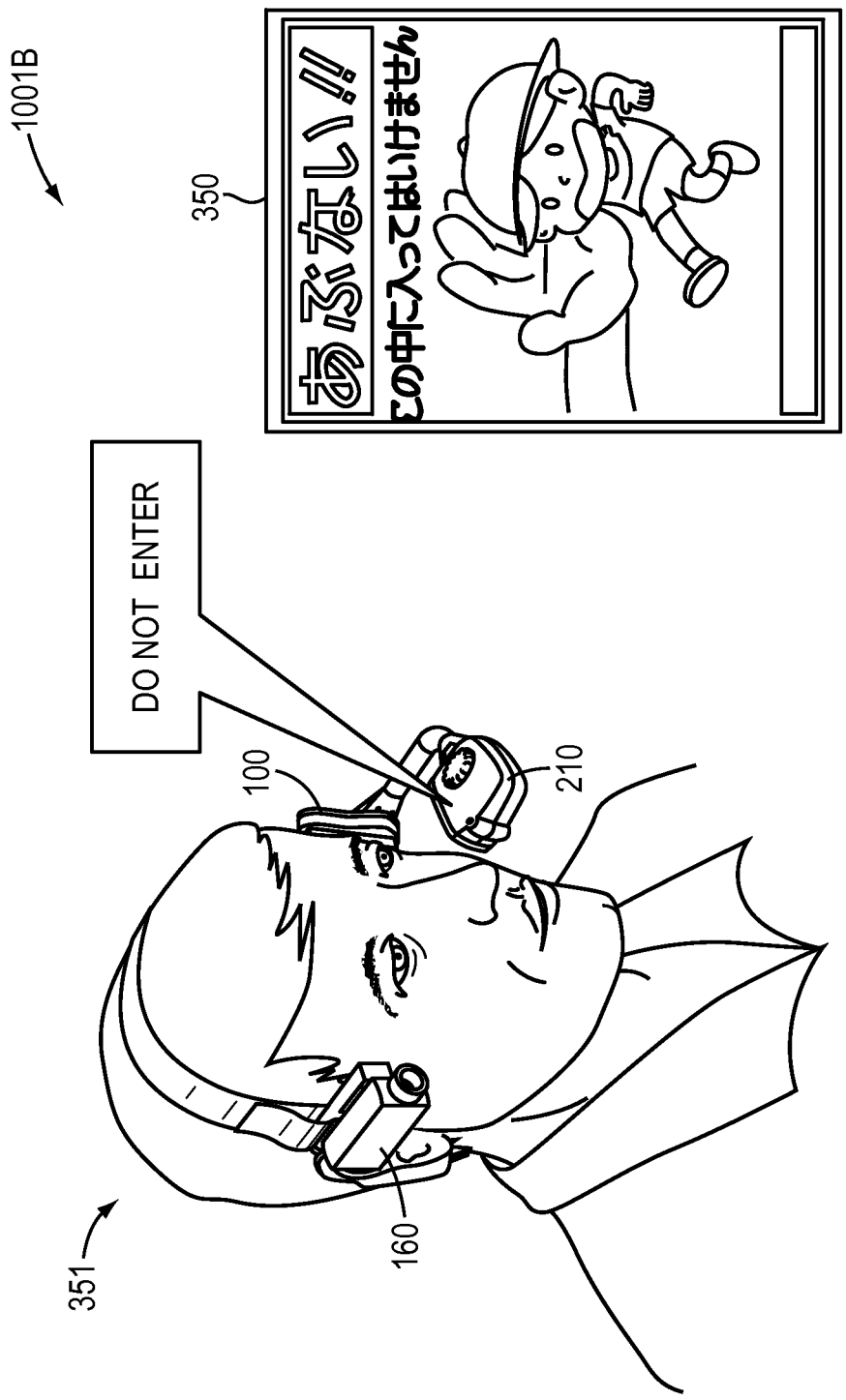

FIG. 6B depicts an example in which TTT translation is useful. For example, the user 351 is travelling in a foreign country and does not understand sign 350 in one (source) language. HC 100 and system 1001B can perform instant TTT translation on camera 160 image of sign 350 as previously described in FIG. 5B. In particular system 1001B instantly/automatically translates the input image text from the one (source) foreign language to the user's default (target) language so that the user 351 is provided with translated text (in target user's language) on microdisplay 210.

Further example embodiments of the present invention may be configured using a computer program product; for example, controls may be programmed in software for implementing example embodiments of the present invention. Further example embodiments of the present invention may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of performing instant speech translation, the method comprising:
   establishing a local communications network including a link between at least a first and a second headset computer;
   capturing speech in a first language at the first headset computer;
   transmitting the captured speech in the first language from the first headset computer directly to a network-based speech recognition service to recognize and transcribe the captured speech as text in the first language;
   receiving the text in the first language at the first headset computer from the network-based speech recognition service;
   broadcasting the text in the first language from the first headset computer over the local network to at least the second headset computer;
   receiving the broadcast text in the first language at the second headset computer;
   transmitting the received broadcast text in the first language from the second headset computer directly to a network-based text translation service to translate the text in the first language to a text in a second language;
   receiving the text in the second language at the second headset computer from the network-based text translation service;
   synthesizing speech from the text in the second language to speech in the second language at the second headset computer;
   presenting the synthesized speech in the second language through an audio speaker of the second headset computer; and
   providing noise cancellation of the captured speech in the first language at the second headset computer.

2. The method of claim 1, further including displaying the text in the second language on a display of the second headset computer.

3. The method of claim 1, further including setting the first and second languages as a preferred operating language of the first and second headset computers, respectively, prior to establishing the local communications network.

4. The method of claim 3, wherein the establishing the local network further includes broadcasting interrogatories including the preferred operating language of each headset computer.

5. The method of claim 1, further including selecting an on-screen option using at least a voice command, a head-motion command, a hand-gesture command, or a combination thereof, to start the method of instant speech translation.

6. The method of claim 1, wherein the local communications network uses a Bluetooth Personal Area Networking (PAN) Profile.

7. The method of claim 1, wherein the first and second headset computers further include a micro-display to present the text in the first or second language.

8. The method of claim 1, wherein the first and second headset computers further include at least a short-range radio and a long-range radio, the first and second headset computers using the short-range radio for the local communications network and using the long-range radio to access the network-based speech recognition service and the network-based text translation service.

9. The method of claim 7, wherein the long-range radio is a Global System for Mobile (GSM), a Code Division Multiple Access (CDMA), or a 4G Long-Term Evolution (LTE) radio.

10. A headset computing device to perform instant speech translation, the device comprising:
    a speech capture module to capture speech in a first language;
    a communications module to establish a local communications network including a link with at least a second headset computer, transmit the captured speech in the first language directly to a network-based speech recognition service to recognize and transcribe the captured speech as text in the first language, receive the text in the first language from the network-based speech recognition service, and broadcast the text in the first language over the local network to the at least second headset computer, receive text in a second language from the at least second headset computer, transmit the received text in the second language directly to a network-based text translation service to translate the text in the second language to a text in the first language, and receive the text in the first language from the network-based text translation service;
    a noise canceling module to cancel speech in the second language at the device; and
    a micro-display to display the translated text in the first language.

11. The headset computing device of claim 10, further comprising a speech synthesizer to synthesize the text in the first language, and an audio speaker to play the synthesized speech.

12. The headset computing device of claim 10, further including a preferred operating language, the preferred operating language being set during an initial set-up of the headset computer and at least prior to establishing the local communications network.

13. The headset computing device of claim 12, wherein the communications module broadcasts interrogatories including the preferred operating language of the headset computer as part of establishing the local communications network including the link with the at least second headset computer.

14. The headset computing device of claim 10, further including an on-screen option to start the method of instant speech translation, the on-screen option being selected by at least a voice command, a head-motion command, a hand-gesture command, or a combination thereof.

15. The headset computing device of claim 10, wherein the communications module uses a Bluetooth Personal Area Networking (PAN) Profile to establish the local communications network.

16. The headset computing device of claim 10, wherein the communications module further includes at least a short-range radio and a long-range radio, the headset computing device using the short-range radio for the local communications network including the communications link with the at least second headset computer and using the long-range radio to access the network-based speech recognition service and the network-based text translation service.

17. The headset computing device of claim 10, wherein the long-range radio is a Global System for Mobile (GSM), a Code Division Multiple Access (CDMA), or 4G Long-Term Evolution (LTE) radio.

18. A non-transitory computer program product for controlling operation of a headset computer, the computer program product comprising a computer readable medium having computer readable instructions stored thereon, which, when loaded and executed by a processor, cause the processor to:

establish a local communications network including a link between at least a first and a second headset computer;

capture speech in a first language at the first headset computer;

transmit the captured speech in the first language from the first headset computer directly to a network-based speech recognition service to recognize and transcribe the captured speech as text in the first language;

receive the text in the first language at the first headset computer from the network-based speech recognition service;

broadcast the text in the first language over the local network to at least the second headset computer;

receive text in a second language from the second headset computer at the first headset computer;

transmit the received text in the second language directly to a network-based text translation service to translate the text in the second language to text in the first language;

receive the text in the first language from the network-based text translation service at the first headset computer; and cancel speech in the second language at the first headset computer.

\* \* \* \* \*